(12) United States Patent
Matheyka et al.

(10) Patent No.: US 7,213,384 B2
(45) Date of Patent: *May 8, 2007

(54) DEVICE FOR THE PRODUCTION OF TUBULAR BAGS

(75) Inventors: Thomas Matheyka, Eppstein (DE); Christian Helwig, Huettenberg (DE)

(73) Assignee: CMD Corporation, Appleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/827,029

(22) Filed: Apr. 19, 2004

(65) Prior Publication Data

US 2005/0155331 A1 Jul. 21, 2005

Related U.S. Application Data

(63) Continuation of application No. 10/292,679, filed on Nov. 12, 2002, now Pat. No. 7,069,709, which is a continuation of application No. 09/610,980, filed on Jul. 6, 2000, now Pat. No. 6,519,922.

(30) Foreign Application Priority Data

Jul. 7, 1999 (DE) .......................... 299 11 847 U
Jun. 13, 2000 (EP) .................................. 00112492

(51) Int. Cl.
*B65B 51/14* (2006.01)

(52) U.S. Cl. ..................... 53/374.6; 53/373.2; 53/551

(58) Field of Classification Search .......... 53/550–552, 53/374.6, 374.8, 373.2
See application file for complete search history.

(56) References Cited

U.S. PATENT DOCUMENTS

| | | | |
|---|---|---|---|
| 2,915,866 A | 12/1959 | Bartlo | |
| 3,070,931 A | 1/1963 | Zwight | |
| 3,256,673 A | 6/1966 | Tew et al. | |
| 3,738,080 A | 6/1973 | Reil | |
| 4,563,862 A | 1/1986 | McElvy | |
| 4,663,917 A | 5/1987 | Taylor et al. | |
| 4,757,668 A | 7/1988 | Klinkel | |
| 5,031,386 A | 7/1991 | Schneider | |
| 5,062,253 A | 11/1991 | Bacon et al. | |
| 5,203,145 A * | 4/1993 | Kammler et al. | 53/552 |
| 5,279,098 A * | 1/1994 | Fukuda | 53/451 |

(Continued)

FOREIGN PATENT DOCUMENTS

DE 24 01 800 7/1975

(Continued)

*Primary Examiner*—Thanh Truong
(74) *Attorney, Agent, or Firm*—George R. Corrigan

(57) ABSTRACT

A device for producing tubular bags filled with bulk goods from continuous foil tubes. The device includes a pair of sealing tools that seal or weld the foil tubes in bag-length intervals. A pair of closing bars connected to the sealing tools are biased toward each other and press the foil tubes before the sealing tools are closed. A stripper is provided to remove the residue of the bulk goods from the area of the seal by a wiping motion in the direction of bag movement through the device. The closing bars are connected to the stripper so that through a closing movement of the closing bars, the stripper is pulled along in the run direction of the foil while touching the foil to strip the area to be sealed before the sealing tools close.

6 Claims, 3 Drawing Sheets

U.S. PATENT DOCUMENTS

| | | | |
|---|---|---|---|
| 5,622,031 A | 4/1997 | Ryan | |
| 5,881,539 A * | 3/1999 | Fukuda et al. | 53/526 |
| 5,937,614 A | 8/1999 | Watkins et al. | |
| 6,138,442 A * | 10/2000 | Howard et al. | 53/477 |
| 6,519,922 B1 * | 2/2003 | Matheyka et al. | 53/552 |
| 6,729,113 B2 * | 5/2004 | Miyamoto et al. | 53/551 |

FOREIGN PATENT DOCUMENTS

| | | |
|---|---|---|
| DE | 40 05 078 | 8/1991 |
| EP | 0 469 819 | 2/1992 |
| EP | 2 271 753 | 4/1994 |
| EP | 0 666 215 | 8/1995 |
| FR | 2 446 172 | 8/1980 |
| GB | 2 052 372 | 1/1981 |
| WO | WO 98/42576 | * 10/1998 |

* cited by examiner

DEVICE FOR THE PRODUCTION OF TUBULAR BAGS

CROSS-REFERENCE TO RELATED APPLICATIONS

This is a continuation of, and claims the benefit of the filing date of, U.S. patent application Ser. No. 10/292,679, filed on Nov. 12, 2002 now U.S. Pat. No. 7,069,709, entitled Device For the Production Of Tubular Bags, which is a continuation of U.S. patent application Ser. No. 09/610,980, filed on Jul. 6, 2000, entitled Device For the Production Of Tubular Bags, which issued as U.S. Pat. No. 6,519,922 on Feb. 18, 2003.

BACKGROUND

During the packing of pourable, but somewhat bulky, products in foil tubular bags, the products have a tendency to bridge across the bag thereby clogging the bag. This can occur frequently as the bags are being filled. As a result, care has to be taken as the bags are being sealed to ensure that pieces of the bulk goods do not remain hanging in the region of the tubular bag being sealed. Bags are typically seated at a seam between a pair of sealer jaws or tools. It is important to ensure that crumbly products and pieces do not remain hanging in the area of the sealed seam due to uncontrolled fall-in. Potato chips because of their low specific weight are a typical example of a troublesome product.

Even with very precise metering, due to the varying character of the product, pieces of the product filling the bag can float or remain hanging in the area of the seal at the moment that the sealing tools seal or close. If these pieces of product or bulk goods are sealed in the region of the seam, then the bag may remain open or seal in an unattractive fashion so as to be unsaleable.

In a typical bag producing device, the welding or sealing tools are mounted on pairs on rotating axles. The axles are positioned on both sides of the tubular foil and turn the sealing tools synchronously in such a way and at a rotational speed such that the opposing sealing tools meet each other after they pass the length of a bag. After meeting on opposing sides of the foil, a pair of tools travel straight together a short distance with the foil. The bag is subsequently sealed with a second pair of tools attached to the opposite side of the axles (i.e. the tools are offset 180 degrees).

Conventional seal tools typically have an associated closing bar that presses the tubular foil together. The seal tools also may include a stripper mounted on the turning axles, ensuring that the foil is pressed together and stripped before the sealing tools meet each other. The foil is thus prepared for the sealing process and at the same time, fall-in of the bulk goods into the area of the seal is prevented. The stripper removes the residue of the bulk goods on the inside of the tubular foil from the region of the seam.

European Patent Application 666215 A1 discloses a bag closing device in which the closing bars and the bar-shaped strippers are mounted on a support plate next to the support for the sealing tools and at a right angle to the foil passing through. The closing bars and the bar-shaped stripper swivel on their supports and are spring-loaded so that they can press the foil together as well as stripping the residue of the bulk goods from the area of the seal with a wiping motion.

To protect the welded tubular bags from the hot sealing tools, EPA 666215 A1 discloses wing-like shields attached to the bars and positioned between the just-sealed bag and the sealing tools. The closing bars serve as strippers, and are moved by the driveshafts. In order to ensure that the sealing tools press the tubular foil together and heat it for the time necessary for sealing, the tools are attached so that they are axially movable and are loaded with compression springs. The circular movement of the sealing tools is modified into a straight line during the sealing segment. One full rotation of the axles that support the sealing tools produces two sealing processes.

The disclosed device has several disadvantages. The attachment and bearing of the necessary components makes installation difficult, requires space, and makes the device sluggish in its movements, thereby also reducing the clock rate of the packing device. Furthermore, because the rotating movement cycles and movement axes can only be positioned opposite to one another in a limited way, the effective zones of the closing bars and the strippers are restricted to a limited area.

The sealing device disclosed in U.S. Pat. No. 4,663,917 operates in a similar manner. German Patent Application No. DE 400 50 078 discloses a sealing device in which the closing bars are attached to the sealing heads directly using springs. The foil on both sides of the sealing tools or jaws is pressed together by the spring-loaded closing bars. A stripping motion is not provided in this design.

The device disclosed in German Patent Application No. DE 24 01 800 does use a stripper, but the stripper only functions as the closing bars described above. A direct connection and movement of this component with the sealing tool in the sense of a stripping movement is not given.

Thus, there remains a need for a bag producing device that includes closing bars and strippers positioned directly on the sealing tool or the tool mount, that provides for movement of these elements so that a secure operating cycle is produced at a high clock frequency.

SUMMARY OF THE INVENTION

According to the present invention a device for the production of tubular bags filled with bulk goods from a continuous foil tube moving in a run direction is provided. The device may include a pair of sealing tools that seal the foil tube in bag-length intervals; a pair of closing bars provided for the tools and directly clamped to the sealing tools, each closing bar biased toward the other closing bar for pressing the foil tube before the sealing tools are closed; and a stripper, which can touch the foil tube, through which the residue of the bulk goods can be removed from the area of the seal by a wiping motion effective in the run direction. The closing bars may be connected to the stripper so that through a closing movement of the closing bars, the stripper is pulled along in the run direction while touching the foil before the sealing tools close.

Preferably, the closing bars are connected to support bars which pass through clamps positioned on the sealing tools and wherein each support bar is loaded against the closing movement of the sealing tools by a return spring. The stripper may be connected to the sealing tools so that the stripper is pulled by the movement of the support bars against the force of the springs in a swinging movement while touching the foil, out of the area where the sealing tools touch the foil. The swinging movement of the stripper typically covers a distance at least three times greater than the distance moved by the support bars. The movement of the support bar is mechanically transmitted to the stripper by a positioner attached to the sealing tool. The positioner may include a tracer pin and the support bar may have a slanted surface positioned to contact an end of the tracer pin.

In an alternative embodiment, the present invention may include a device for the production of tubular bags filled with bulk goods from a continuous foil tube moving through the device. The device may include a pair of moveable sealing tools positioned on opposite sides of the foil tube, the sealing tools configured to come together to seal the tube. Each sealing tube may include a closing bar biased toward the closing bar on the opposing sealing tool and adapted to move with the sealing tool to contact the tube; a sealing jaw positioned opposite the sealing jaw on the opposing sealing tool so that when the sealing tools come together the sealing jaws contact the tube to thereby seal the tube; and a stripper located downstream from the closing bar in the direction of movement of the foil tube and being configured to move along the tube in the direction the tube is moving to strip the bulk goods away from the area of the tube to be sealed at the same time that the sealing jaw is moving toward the tube.

The closing bars may move in a direction generally perpendicular to the direction of movement of the tube and are biased toward each other by a spring. Each sealing tool may further comprise a support bar connected to the closing bar and aligned in the direction of movement of the closing bar. The support bar may be configured to move in a direction generally perpendicular to the movement of the tube against the bias on the closing tube.

The stripper may include a stripper bar. The stripper bar may be connected to the closing bar so that movement of the closing bar causes movement of the stripper bar along the tube in the direction the tube is moving. A tracer pin may be provided so that when the support bar moves the motion of the support bar is transferred to the stripper through the pin. The end of the support bar adjacent the pin may include a tapered surface so that as the end of the support bar moves away from the tube the tapered surface slides along an end of the pin to thereby force the pin to move in a longitudinal direction. The pin is generally positioned between the support bar and the stripper so that when the pin is forced to move in the longitudinal direction by the support bar the other end of the pin contacts the stripper to cause the stripper to move along the surface of the foil away from the sealing jaws and the area of the foil to be sealed.

The stripper bar may be connected to a mechanical linkage pivotally mounted to the sealing tool. The tracer pin may be positioned between the support bar and the mechanical linkage so that linear movement of the support bar is translated to swinging movement of the mechanical linkage.

It is to be understood that both the foregoing general description and following detailed description are exemplary and explanatory only, and are not restrictive of the invention as claimed.

BRIEF DESCRIPTION OF THE DRAWINGS

These and other features, as aspects, and advantages of the present invention will become apparent from the following description, appended claims, and the accompanying exemplary embodiment shown in the drawings, which are briefly described below.

DETAILED DESCRIPTION

Although references are made below to directions, such as left, right, up, down, etc., in describing the drawings, they are made relative to the drawings (as normally viewed) for convenience. These directions are not intended to be taken literally or limit the present invention in any form. Identical or similar components have the same reference number in all figures.

The present invention is directed to a device for the production of tubular bags filled with bulk goods and similar items. The device produces bags from continuously running foil tubes using sealing tools. The sealing tools typically include tool pairs that seal and/or weld the foil tubes at bag-length intervals. The device may also include pairs of closing bars which press the foil tubes flat before sealing. More particularly, the present invention is directed to a device in which a pair of strippers supplement the closing bars by contacting the foil tube and removing the residue of the bulk goods from the area of the tube to be sealed by a wiping motion in the run direction before the application of the sealing tools.

According to the invention, this is achieved by clamping the closing bars, which can be laid against the foil, directly to the sealing tools or their supports, respectively, in such a way that they are pressed against the foil by the closing movement of the sealing tools prior to same while tensioning a return spring. The closing bars may be connected to the strippers in such a way that through their closing motion, with the stripper touching the foil, the strippers are pulled along in the run direction before the sealing tools close.

It is particularly advantageous to connect the closing bars with the strippers, which are positioned downstream in the run direction, so that, by means of the tension movement produced against the return spring or something similar, with the movement of the sealing tools, the strippers are pulled along in the run direction while touching the foil before the sealing tools close.

It is advantageous to attach the bearings or clamps of the closing bars with spring loading to the supports of the sealing tools. With the closing movement of the sealing jaws, the closing bars are positioned against the foil and press it flat. The support bars are thereby moved against the power of a spring after the application of the closing bars. This movement is transmitted to the bars serving as strippers. The strippers are moved with the closing movement of the sealing tools in the fill direction, while touching the foil, thereby removing the residue of the bulk goods positioned inside the foil tube from the area of the seal.

An exemplary embodiment will be described and its mode of operation will be explained with reference to the drawings.

Figure 1:
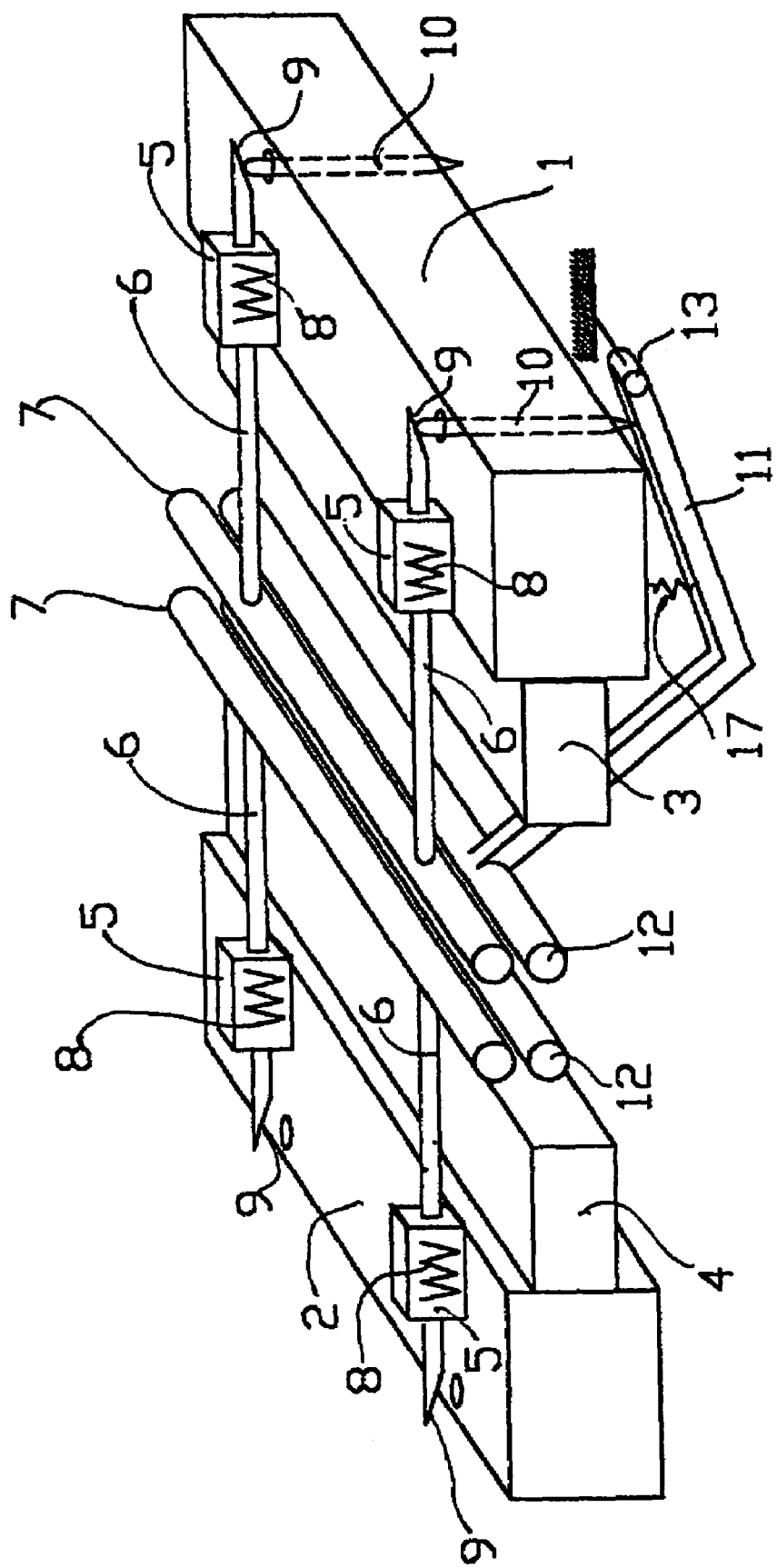
FIG. 1 is a schematic representation of a bag producing device of the present invention.

FIG. 1 shows both tool mounts 1 and 2, moved by a drive or crank 16 (shown in FIG. 2) in which the sealing jaws 3 and 4 are attached. Clamps 5 are attached in pairs on each of the tool mounts 1, 2, which clamp and guide support bars 6. The support bars 6 are clamped or connected to the closing bars 7 at their front ends. In the clamp 5, the support bars 6 are loaded with the return spring 8. If the tool mounts are moved against each other to seal the tubular bag, the closing bars 7 meet each other, including the tubular foil which is not shown, and push the support bars 6 through the clamp 5 against the return power of the spring 8 to the rear away from the tubular foil.

The rear ends of the support bars 6, or additional components attached to them, include slanted surfaces 9. The tracer pins 10 put into the tool mount 1, 2 contact the slanted surfaces 9. The tracer pins 10 press on a portion of the linkage 11 with their lower end.

The linkage 11 is connected to the bar 12 which acts as a stripper. For reasons of clarity, the linkage 11 in FIG. 1 is only depicted once and only schematically. Naturally, each of the tracer pins 10 and stripper bars 12 has a corresponding linkage 11. The linkage 11 is clamped to the tool mounts 1, 2 and pivotally mounted in the bearings 13 in such a way that the movement of the tracer pin 10 produced by the slanted surface 9 is mechanically translated in such a way that the bars 12 touching the foil move downward from the region between the sealing jaws 3, 4 before the jaws close.

Any possible residue of the bulk goods remaining on the internal wall of the foil is wiped off by this movement of the bars 12. The sealing surfaces of the foil are thus free from the residue of the bulk goods. The mechanical translation shown is typically arranged so that motion of the support bar produces three times as much motion of the stripper bar 12. The ratio of motion may be larger than three or, if necessary, can be aided by means of supplementary devices with compressed air.

Figure 2:
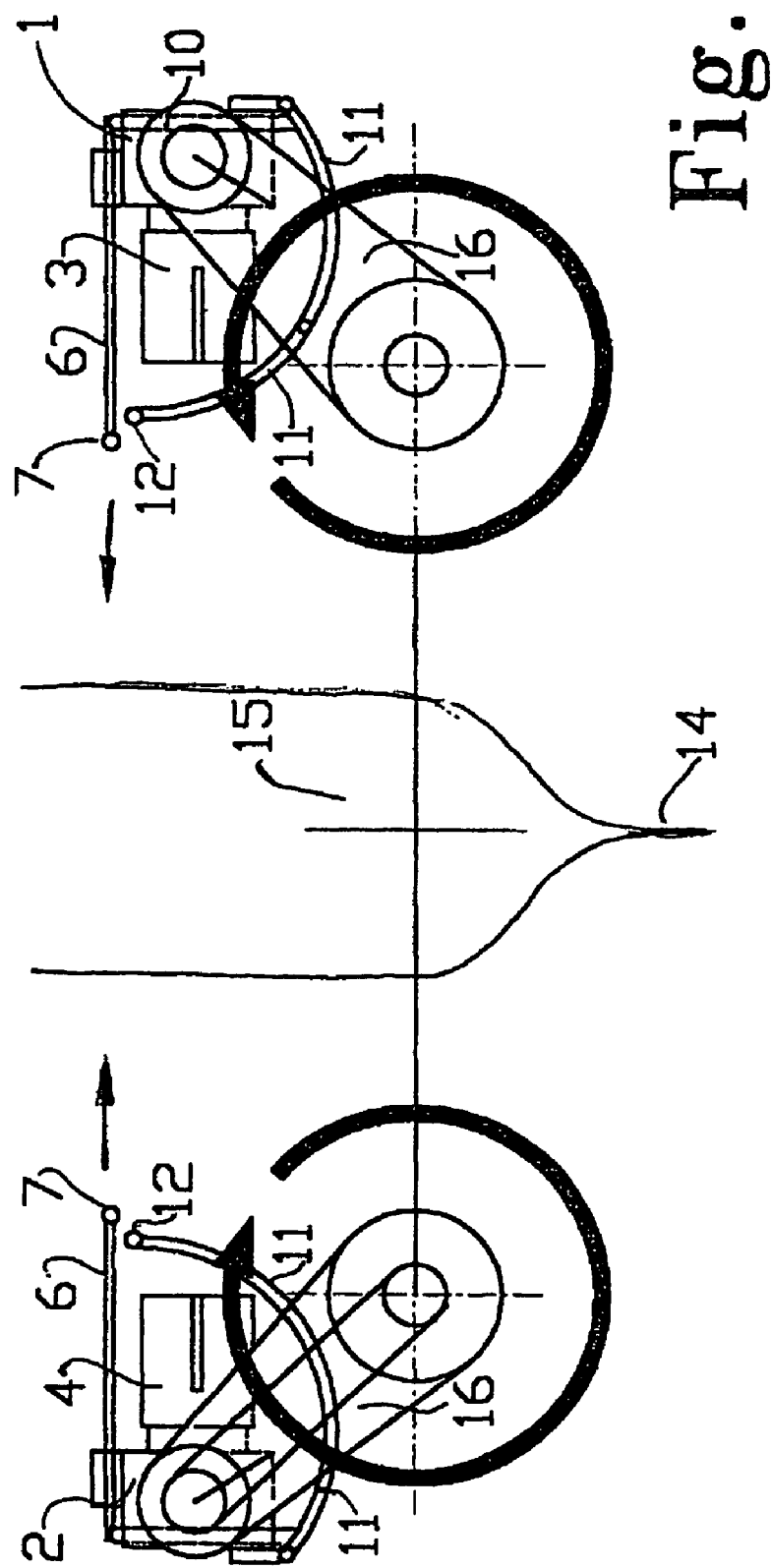
FIG. 2 is a front view in elevation of the device of FIG. 1 with open sealing jaws or tools, and a filled tubular bag running between them.

FIG. 2 shows a sealing tool in an open position, in which the tubular bag 14 can be filled with bulk goods 15. The tool mounts 1, 2 with the sealing jaws 3, 4 are positioned on cranks 16 equipped with return elements in such a way that when the cranks are turned the position of the sealing jaws 3, 4 is always directed toward each other and thereby also against the tubular foil 14.

Figure 3:
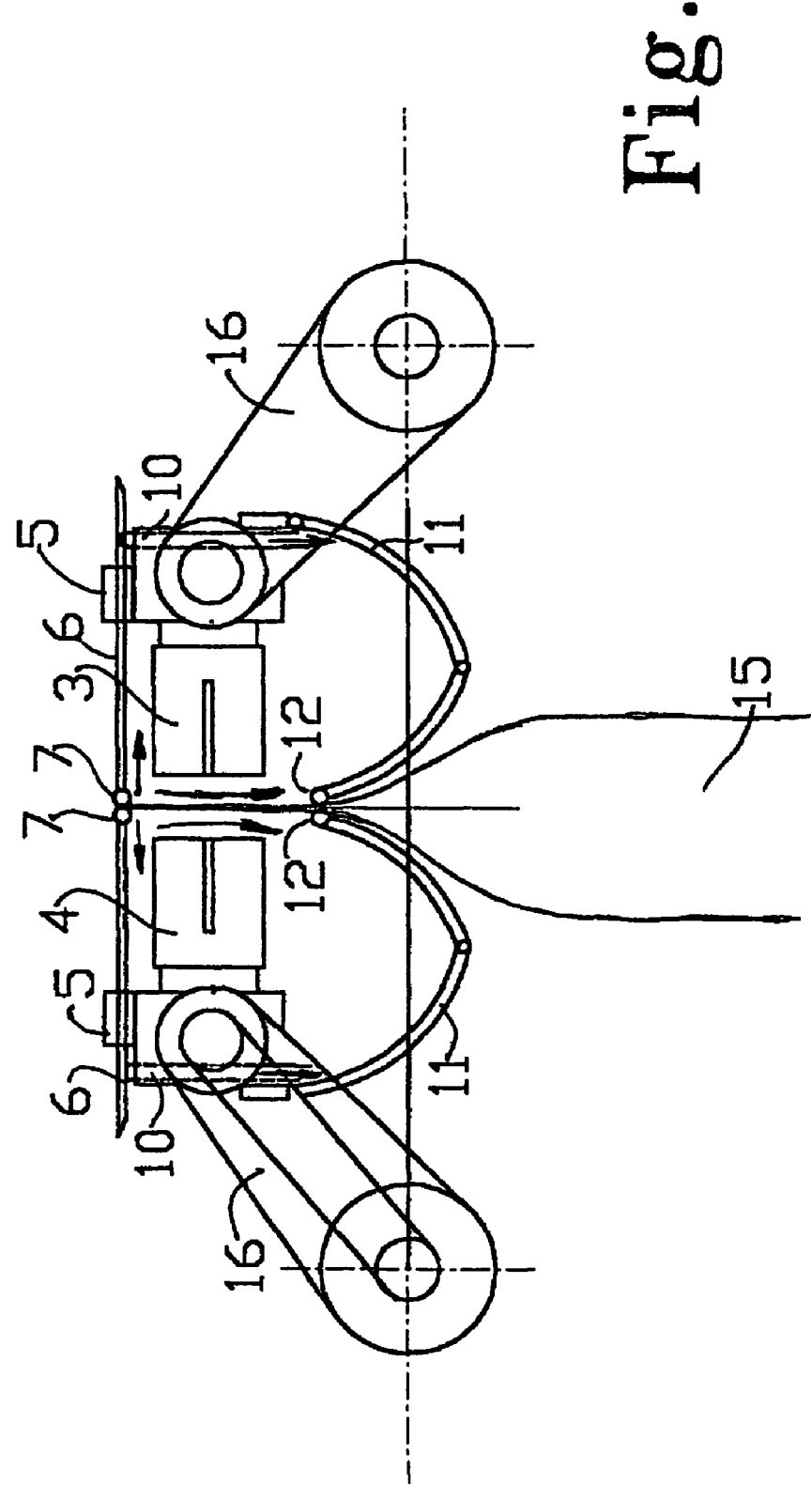
FIG. 3 is the front view of FIG. 2, in which the sealing jaws are about to close.

When the closing bars 7 meet each other during a closing movement of the sealing jaws 3, 4, the support bars 6 are thus moved to the rear against the return power of spring 8. The tracer pins 10 are pressed downwards by the slanted surfaces 9. As shown in FIG. 3, the stripper bars 12 are pulled away downwards by the linkage or lever arm 11 before the sealing jaws 3, 4 meet each other. Any residue of the bulk goods 15 that may remain in the area of the seal is thereby wiped off. A spring 17 may be included to provide the force necessary to return the linkage 11 and stripper bars 12 to their original positions. The spring 17 may be replaced by a drive or a counterweight on the lever arm 11.

The embodiment shown has the advantage not only that the tool mounts 1, 2 with the sealing tools 3, 4 are only required to perform a small circular parallel movement, but also that the necessary energy supply and control equipment operate without a winding effect and without rotary joints. By mounting the closing bars 7 and stripper 12 on the tool mounts 1, 2, these components can operate without expensive, heavy, and therefore sluggish components, which makes operation of the packing machine at a high clock frequency considerably easier.

Through having the design form of the closing bars in direct contact to the sealing tool and detached from a rotating tool mount, the device described according to the invention is also suitable for packing devices in which intermittent operation with individually supplied packaging units is performed instead of a continuously running foil tube.

The priority documents, European Patent Application 00112492.4 filed Jun. 13, 2000 and German Patent Application 299 11 847.9 filed Jul. 7, 1999, are hereby incorporated by reference herein.

Given the disclosure of the present invention, one versed in the art would appreciate that there may be other embodiments and modifications within the scope and spirit of the invention. Accordingly, all modifications attainable by one versed in the art from the present disclosure within the scope and spirit of the invention are to be included as further embodiments of the present invention. The scope of the present invention is to be defined as set forth in the following claims.

What is claimed is:

1. A device for the production of tubular bags filled with bulk goods from a continuous foil tube moving in a run direction comprising:

at least a pair of tool mounts that follow an orbital movement, wherein the tool mounts have a near end and a distal end, and wherein the near end is linked to a device that imparts the orbital movement to the tool mounts;

a first pair of opposing tools, each mounted on one of the pair of tool mounts, that cyclically engage the tube and seal the foil tube in bag-length intervals during a portion of the orbital movement;

a second pair of opposing tools, each mounted on one of the pair of tool mounts, that remove bulk goods from the area of the seal by a wiping motion effective in the run direction, linked to follow a path responsive to the orbital path; and a pair of opposing passive devices, each mounted near the distal end of each tool mount effective during at least part of the portion of the orbital movement, wherein the passive device affects the path of a selected pair of the first and second pairs of tools mounted on a carrier such that the distal end of the selected pair follows a path parallel to a path the near end of the selected pair follows, wherein the pair of passive devices includes a tracer pin.

2. The apparatus of claim 1, wherein the pair of passive devices is effective during at least all of the portion of the orbital movement.

3. The apparatus of claim 1, wherein the pair of passive devices is effective during at least the time the tube is engaged.

4. The apparatus of claim 1, wherein the pair of passive devices is linked to the second pair of opposing tools.

5. The apparatus of claim 1, further comprising a second pair of opposing passive devices, each mounted near the near end of each carrier, effective during at least part of the portion of the orbital movement, wherein the second pair of passive devices affects the path of the second pair of tools mounted on the carrier.

6. The apparatus of claim 1, further comprising a second pair of tool mounts, each having tools mounted thereon as did the first pair of tool mounts.

* * * * *